(12) United States Patent
Chen et al.

(10) Patent No.: US 10,782,457 B2
(45) Date of Patent: Sep. 22, 2020

(54) GRATING FOR DUAL VISION DISPLAY AND DUAL VISION DISPLAY APPARATUS

(71) Applicants: Beijing BOE Optoelectronics Technology Co., Ltd., Beijing (CN); BOE Technology Group Co., Ltd., Beijing (CN)

(72) Inventors: Xiuyun Chen, Beijing (CN); Dae-Keun Yoon, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 106 days.

(21) Appl. No.: 16/318,628

(22) PCT Filed: Jul. 2, 2018

(86) PCT No.: PCT/CN2018/075557
§ 371 (c)(1),
(2) Date: Jan. 17, 2019

(87) PCT Pub. No.: WO2019/007061
PCT Pub. Date: Jan. 10, 2019

(65) Prior Publication Data
US 2019/0285780 A1    Sep. 19, 2019

(30) Foreign Application Priority Data

Jul. 4, 2017    (CN) .......................... 2017 1 0540990

(51) Int. Cl.
*G02B 5/18*    (2006.01)
*G02F 1/1335*  (2006.01)

(52) U.S. Cl.
CPC .......... *G02B 5/1814* (2013.01); *G02F 1/1335* (2013.01); *G02F 1/133512* (2013.01); *G02F 1/133526* (2013.01)

(58) Field of Classification Search
CPC ......... G02F 1/133512; G02F 1/133526; G02F 1/1335; G02B 5/1814
See application file for complete search history.

(56) References Cited

U.S. PATENT DOCUMENTS

| 5,764,319 A | 6/1998 | Nishihara |
| 6,882,381 B2 | 4/2005 | Sumida et al. |

(Continued)

FOREIGN PATENT DOCUMENTS

| CN | 102231019 A | 11/2011 |
| CN | 104317060 A | 1/2015 |

(Continued)

OTHER PUBLICATIONS

International Search Report and Box V of Written Opinion for International Patent Application No. PCT/CN2018/075557, dated May 14, 2018, 5 pages.

(Continued)

*Primary Examiner* — Wen Huang
(74) *Attorney, Agent, or Firm* — Westman, Champlin & Koehler, P.A.

(57) ABSTRACT

A grating for dual vision display and a dual vision display apparatus are disclosed. The grating can include a plurality of light-transmitting portions and light-shielding portions arranged alternatively. Each of the light-transmitting portions includes a first lens device and a second lens device. The first lens device is configured to converge light incident onto the first lens device towards a first direction so as to give an image display at a first view angle; and the second lens device is configured to converge light incident onto the (Continued)

second lens device towards a second direction so as to give an image display at a second view angle.

20 Claims, 7 Drawing Sheets

(56) References Cited

U.S. PATENT DOCUMENTS

| | | |
|---|---|---|
| 2009/0161213 A1 | 6/2009 | Lin et al. |
| 2018/0120574 A1 | 5/2018 | Wei |
| 2018/0217390 A1 | 8/2018 | Zha |

FOREIGN PATENT DOCUMENTS

| | | |
|---|---|---|
| CN | 104536069 A | 4/2015 |
| CN | 105654874 A | 6/2016 |
| CN | 105700227 A | 6/2016 |
| CN | 105892074 A | 8/2016 |
| CN | 106896575 A | 6/2017 |
| CN | 107193069 A | 9/2017 |

OTHER PUBLICATIONS

First Office Action, including Search Report, for Chinese Patent Application No. 201710540990.1, dated Jan. 23, 2019, 17 pages.

GRATING FOR DUAL VISION DISPLAY AND DUAL VISION DISPLAY APPARATUS

CROSS-REFERENCE TO RELATED APPLICATION

This application is a Section 371 National Stage Application of International Application No. PCT/CN2018/075557, filed on 7 Feb. 2018, entitled "Grating for Dual Vision Display and Dual Vision Display Apparatus", which has not yet been published, and which claims priority to Chinese Application No. 201710540990.1, filed on 4 Jul. 2017, incorporated herein by reference in their entirety.

TECHNICAL FIELD

The present disclosure relates to optical field, more particularly, to a grating for dual vision display and a dual vision display apparatus.

BACKGROUND

A grating is an optical element for enabling chromatic dispersion of lights by means of multiple-slit diffraction principle. As researches of the people become more intensive, the grating is applied more and more widely into fields such as metrology, spectroscopy, optical communication, information processing, and display techniques.

For example, the grating can be applied into the display techniques so as to give the dual vision display. In the existing dual vision display apparatus, the grating may be disposed at a light exiting side of the display panel. With such grating, when observing the display panel, the viewers at a left side thereof only can see even (or odd) columns of pixels; whereas the viewers at a right side thereof only can see odd (or even) columns of pixels. In this way, the viewers at the left and right sides enable to see different images with displaying a first image on the even columns of pixels and a second image on the odd columns of pixels, thereby obtaining the effects of dual vision display.

SUMMARY

Embodiments of the present disclosure provide a grating for dual vision display, including: a plurality of light-transmitting portions and a plurality of light-shielding portions arranged alternatively; wherein each of the light-transmitting portions includes a first lens device and a second lens device, the first lens device is configured to converge a light incident onto the first lens device towards a first direction so as to give an image display at a first view angle; and the second lens device is configured to converge a light incident onto the second lens device towards a second direction so as to give an image display at a second view angle.

In some embodiments, the first direction is a direction inclined towards a side where the first lens device is located, of the light-transmitting portion from a longitudinal central plane of the light-transmitting portion, the second direction is a direction inclined towards a side where the second lens device is located, of the light-transmitting portion from the longitudinal central plane of the light-transmitting portion, and the first lens device and the second lens device are respectively located at two sides of the longitudinal central plane of the light-transmitting portion.

In some embodiments, both the light-transmitting portion and the light-shielding portion are strip-shaped.

In some embodiments, the first lens device and the second lens device within a same light-transmitting portion are adjoined with each other.

In some embodiments, each the first lens device and the second lens device is constituted by one or more converging lens.

In some embodiments, the converging lens is a convex lens.

In some embodiments, each of the first lens device and the second lens device is adjoined with one of the light-shielding portions at a side away from the longitudinal central plane.

In some embodiments, each of the first lens device and the second lens device is partially overlapped with one of the light-shielding portions at a side away from the longitudinal central plane.

In some embodiments, the grating further includes a transparent substrate for carrying the first lens device, the second lens device and the light-shielding units.

In some embodiments, the first lens device and the second lens device are integral with the transparent substrate.

In some embodiments, a recess is provided on the transparent substrate, and an inner wall of the recess constitutes arc-shaped surfaces of the first lens device and the second lens device.

In some embodiments, each of the first lens device and the second lens device is formed by protrusions provided on the transparent substrate.

In some embodiments, distance between the longitudinal central plane and a top edge of a side face of the first lens device facing towards the light-shielding portion adjacent to the first lens device is larger than distance between the longitudinal central plane and a bottom edge of the side face of the first lens device.

In some embodiments, distance between the longitudinal central plane and a top edge of a side face of the second lens device facing towards the light-shielding portion adjacent to the second lens device is larger than distance between the longitudinal central plane and a bottom edge of the side face of the second lens device.

In some embodiments, each of the light-shielding portions includes a light-shielding layer composed of opaque material.

In some embodiments, the light-shielding layer is located at a light exiting side of the transparent substrate; the grating further includes a reflective layer located on the light-shielding portion and provided between the transparent substrate and the light-shielding layer.

In some embodiments, the grating further includes mesh dots located at a light incident side of the transparent substrate, for scattering the lights reflected by the reflective layer to each of the first lens device and the second lens device via the mesh dots.

In some embodiments, the mesh dots are integral with the transparent substrate.

An embodiment of the present disclosure also provides a dual vision display apparatus, including the grating as described in any one of the above embodiments.

In some embodiments, the dual vision display apparatus is a liquid crystal display apparatus including a backlight module and a liquid crystal display panel, and the grating is located between the backlight module and the liquid crystal display panel.

BRIEF DESCRIPTION OF THE DRAWINGS

The drawings used by the embodiments of the present disclosure or the prior art are briefly discussed herein for explaining the technical solutions in the embodiments or the prior art more clearly. It is apparent that the accompanying drawings are only some embodiments of the present disclosure. The skilled person in the art can obtain other drawings according to these drawings without any creative efforts.

DETAILED DESCRIPTION OF EMBODIMENTS

Technical solutions of the present disclosure will be described clearly and completely with reference to the drawings of the embodiments in the present disclosure. It is apparent that the described embodiments are only part of embodiments of the present disclosure, rather than all of the embodiments. On the basis of the embodiments of the present disclosure, all of other embodiments that can be obtained by the skilled person in the art without any creative efforts also belong to the scope of the present disclosure.

In addition, in the following detailed description, numerous specific details are set forth for interpretation and to provide a full understanding to the disclosed embodiments. However, it is obvious that one or more embodiments can be implemented without these specific details. In other instances, known structures and devices are illustrated in a simplified drawing.

During the use of the relevant apparatus of the prior art, the inventors have found that the effective utilization rate of the lights in the dual vision display apparatus present in the relevant art is relatively low.

Figure 1:
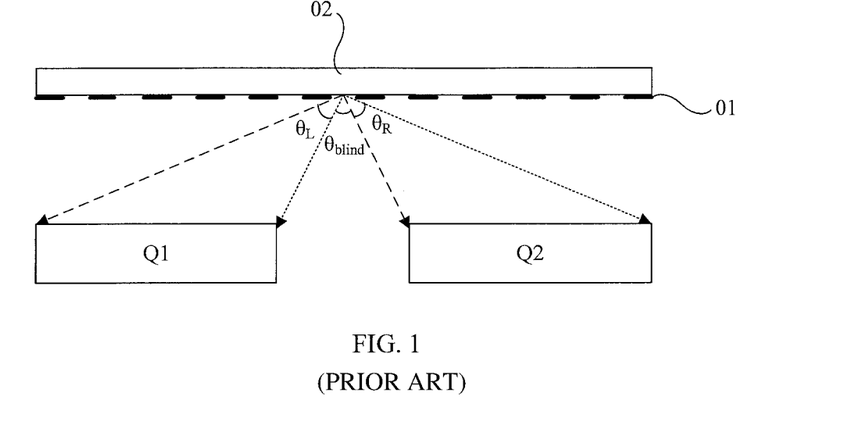
FIG. 1 is a schematic view showing a structure of a dual vision display apparatus.

FIG. 1 is a schematic view showing a structure of a dual vision display apparatus in the relevant art. This dual vision display apparatus includes a grating 01 at a light exiting side of the display panel 02. With such grating 01, when observing the display panel, the viewers at a left side thereof only can see even (or odd) columns of pixels; whereas the viewers at a right side thereof only can see the odd (or even) columns of pixels. In this way, the viewers at the left and right sides enable to see different images respectively with displaying a first image Q1 on the even columns of pixels and a second image Q2 on the odd columns of pixels, thereby obtaining the effects of dual vision display.

However, as shown in FIG. 1, with respect to a region at a middle of the display apparatus, since the exiting lights for the first image Q1 and the second image Q2 overlap with each other, the image which is observed at this region (the region corresponding to the angle $\theta_{blind}$, herein called as the $\theta_{blind}$ region) is a mixture (or an overlapping image) of the first image Q1 with the second image Q2, that is, it is impossible to observe the image as normally displayed, but it is feasible to normally see the first image Q1 and the second image Q2 at the regions at left and right sides of this region (i.e., the regions corresponding to the angles $\theta_L$ and $\theta_R$, called as $\theta_L$ and $\theta_R$ regions respectively).

On the basis of this, as for the whole display apparatus, when the light emitting efficiency of the light source is constant, because the exiting lights in the $\theta_{blind}$ region cannot be used normally, the effective exiting lights at the $\theta_L$ and $\theta_R$ regions do not have sufficient brightness (generally, a value of the brightness at these regions is less than 200 nit). In other words, the dual vision display apparatus in the relevant art has a relatively low effective utilization rate for the lights.

An embodiment of the present disclosure provides a grating for dual vision display. This grating can include a plurality of light-transmitting portions 10 and a plurality of light shielding portions 20 alternatively arranged. The light-transmitting portions 10 each include a first lens device 101 and a second lens device 102. The first lens device 101 is configured to converge the lights incident onto it towards a first direction, so as to give the image display at a first view angle. The second lens device 102 is configured to converge the lights incident onto it towards a second direction, so as to give the image display at a second view angle.

Figure 2:
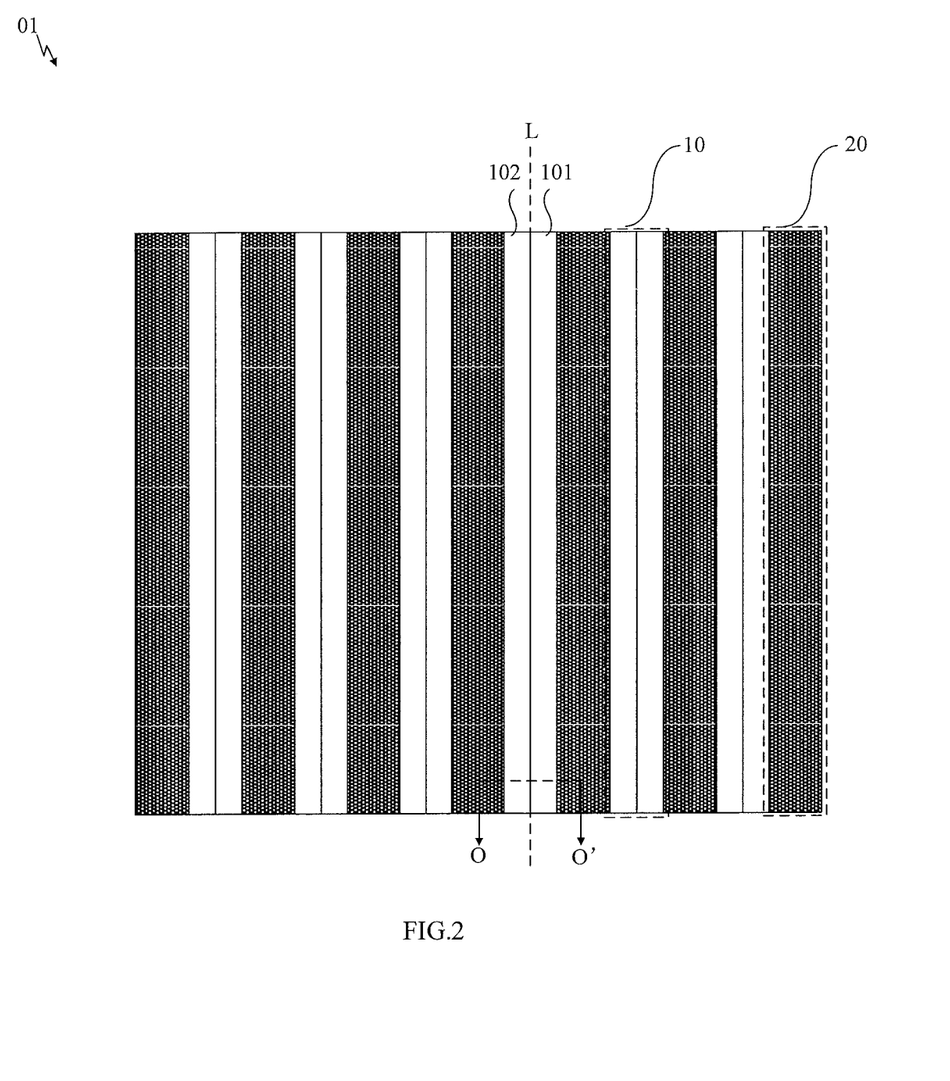
FIG. 2 is a schematic view of showing a structure of a grating for the dual vision display apparatus provided by an embodiment of the present disclosure.
Figure 3:
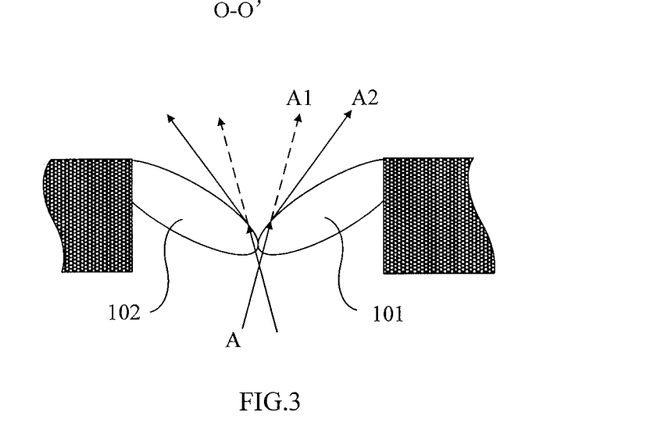
FIG. 3 is a cross sectional schematic view of a structure cut along a line O-O' in FIG. 2.

In an embodiment, as shown in FIG. 2, the grating 01 includes a plurality of strip-shaped light-transmitting portions 10 and strip-shaped light-shielding portions 20 which are arranged alternatively. Each of the light-shielding portions 20 is located between the two light-transmitting portions 10 adjacent to each other. The light-transmitting portion 10 includes a strip-shaped first lens device 101 and a strip-shaped second lens device 102, which are respectively located at both sides of a longitudinal central plane L and arranged adjacent to each other side by side. As shown in FIG. 3 (a sectional view cut along a line O-O' in FIG. 2), the lights passing through the first lens device 101 converge towards the first direction and the lights passing through the second lens device 102 towards the second direction. The direction along which the longitudinal central plane L extends is consistent with the direction along which the light-transmitting portion 10 extends and the direction along which the light-shielding portion 20 extends. The direction along which they extend is referred to the up and down direction in the embodiment of FIG. 2. The longitudinal central plane L is also called as a central plane along a widthwise direction.

Figure 5:
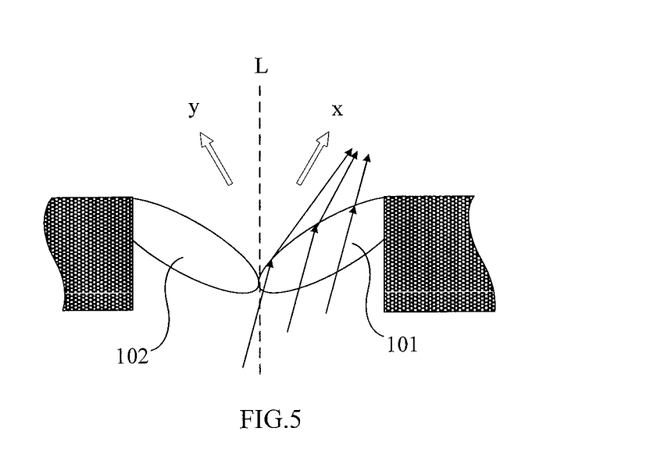
FIG. 5 is a schematic view of an optical path for one grating provided by an embodiment of the present disclosure.
Figure 6:
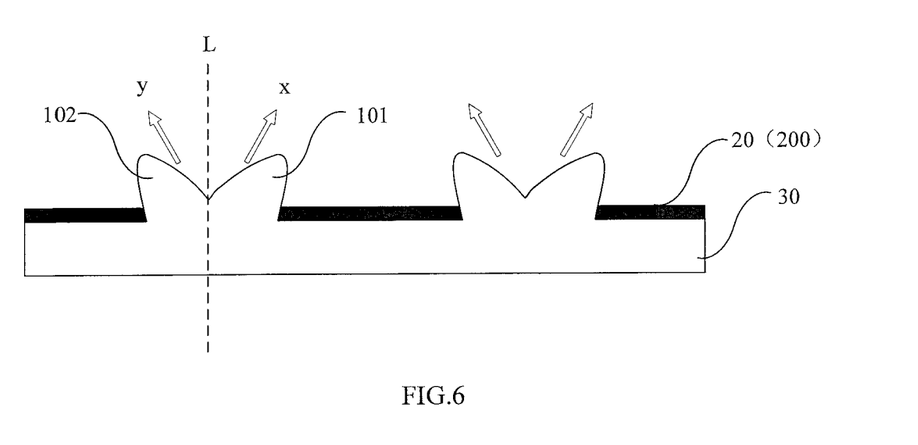
FIG. 6 is a schematic view showing a structure for one grating provided by an embodiment of the present disclosure.

As an example, the first direction is a direction inclined towards the side where the first lens device 101 is located and away from the longitudinal central plane L of the light-transmitting portion 10 (with reference to the x direction of FIGS. 5 and 6). The second direction is a direction inclined towards the side where the second lens device 102 is located and away from the longitudinal central plane L of the light-transmitting portion 10 (with reference to the y direction of FIGS. 5 and 6). The first lens device 101 and the second lens device 102 are located at both sides of the longitudinal central plane L of the light-transmitting portion 10 respectively. With regard to the inclination angles of the first and second directions with respect to the longitudinal central plane L of the light-transmitting portion 10, the skilled person in the art can select these inclination angles according to display requirements of the first view angle and the second view angle.

As an example, the first lens device 101 and the second lens device 102 in the same light-transmitting portion 10 are adjoined with each other.

It should be noted herein that firstly, the first lens device 101 can be one strip-shaped lens (for example, converging lens, such as convex lens) of the light-transmitting portion 10, or one strip-shaped lens composed of a plurality of lenses (for example, converging lenses, such as convex lenses) in the light-transmitting portion 10. The present disclosure is not intended to make any specific limitations on this matter. As such, the second lens device 102 is set in a same manner as the first lens device 101, and the more details are omitted herein. The present disclosure is explained further with the embodiments that the first lens device 101 and the second lens device 102 each are a strip-shaped convex lens of the light-transmitting portion 10. The skilled person in the art should understand that in the embodiments of the present disclosure, the converging lens is not limited to the convex lens, and can also be any kind of lens having the converging function as known in the relevant art.

Secondly, the first lens device 101 and the second lens device 102 can be a separate structure provided adjacent with each other and side by side, or an integral structure. The embodiments of the present disclosure do not make any limitations to this and they can be set as actually required.

Figure 4:
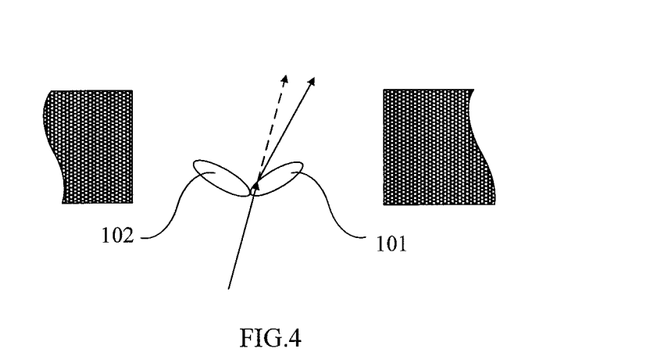
FIG. 4 is a cross sectional schematic view showing a structure of another grating provided by another embodiment of the present disclosure.

Thirdly, in a case that the strip-shaped first lens device 101 and the strip-shaped second lens device 102 are provided at two sides of the longitudinal central plane L of the light-transmitting portion 10 and adjacent to each other side by side, the first lens device 101 and the second lens device 102 each can be adjoined or partially overlapped with one light-shielding portion 20 at a side away from the longitudinal central plane L, as shown in FIG. 3; alternatively, the first lens device 101 and the second lens device 102 each cannot be adjoined with the corresponding one light-shielding portion 20 at a side away from the longitudinal central plane L, or there is a gap between the first lens device 101 or the second lens device 102 and the corresponding one light-shielding portion 20 as shown in FIG. 4. The present disclosure is not intended to make any limitations to this, and they are also feasible as long as at least a part of the exiting lights which are originally at the $\theta_{blind}$ region adjacent to the longitudinal central plane, is redirected under the function of the lens in comparison with the case that the light-transmitting portion 10 is not provided with the such lens devices, for example as shown in FIG. 3, and the direction of the exiting lights along the dotted line when the lens is not provided would be changed as that shown by the solid line (i.e., the lights A are changed to the lights labeled as A2 from A1 when the lens is not provided), so that the lights can be used more effectively.

Of course, two configurations as shown in FIGS. 3 and 4 are provided herein. On one hand, the configuration in FIG. 3 can effectively utilize the exiting lights at the $\theta_{blind}$ region as possible as it can (please see FIG. 5), thereby reducing the brightness at the $\theta_{blind}$ region to the largest extent, while increasing the brightness at the left and right fields of view; on the other hand, it can not only adjust the directions of the exiting lights from the $\theta_L$ region and the $\theta_R$ region by adjusting the width between the light-transmitting portion 10 and the light-shielding portion 20, but also can further adjust the directions of the exiting lights from the $\theta_L$ region and the $\theta_R$ region asymmetrically or symmetrically (with reference to FIG. 5) by adjusting the inclination of the convex faces of the first lens device 101 and the second lens device 102 (for example convex lens) respectively, that is, the observing positions at the left view region and the right view region can be effectively adjusted. Therefore, as one example, the first lens device 101 and the second lens device 102 both can be adjoined or partially overlapped with the corresponding light-shielding portion 20 at the side way from the longitudinal central plane L.

Concerning the above, in the grating of the dual vision display apparatus in the relevant art, the lights directly pass through the striped slit (as for the light-transmitting portion without the lens), thereby the lights at the region adjacent to the longitudinal central plane are overlapped and mixed, and cannot be used normally. In the embodiments of the present disclosure, with the light converging function of the lens, the first and second lens devices enable at least a part of the lights which are originally at the region adjacent to the longitudinal central plane, to converge to the left and right fields of view towards the directions away from the longitudinal central plane respectively under the action thereof. In other words, the dual vision display apparatus having the grating in the present disclosure can improve the effective utilization rate to the lights so that the brightness values at the left and right fields of view can be increased.

Although the contents of the present disclosure are set forth taking the strip-shaped light-transmitting portion and light-shielding portion as an example in the above described embodiments, the light-transmitting portion and the light-shielding portion can also have other shapes except the striped shape as long as it can meet the requirements on the dual vision display function.

Embodiments of the present disclosure also provide a dual vision display apparatus, including the above described grating, which has the same structure and same beneficial effects as the grating in the above embodiments. Because the above embodiments have described the structure and the beneficial effects of the grating in detail, they are omitted herein.

Please be noted that in the embodiments of the present disclosure, the dual vision display apparatus specifically at least can include a liquid crystal display panel and an organic light emitting diode display panel, for example, the display panel can be applied into any products or components having the dual vision display function such as the liquid crystal display devices, the liquid crystal TVs, mobile phones or tablet computers. The grating 01 in the present disclosure will be explained further with reference to the dual vision display apparatus.

In order to facilitate the production of the above grating and to simplify the installation of the grating into the dual vision display apparatus, as shown in FIG. 6, the grating 01 in the embodiment of the present disclosure further includes a transparent substrate 30 for bearing the first lens device 101, the second lens device 102 and the light-shielding portion 20. The light-shielding portion 20 generally includes a light-shielding layer 200 composed of opaque materials (for example mainly the materials for the black matrix), so as to prevent the lights from passing though the light-shielding portion 20. If the light-shielding layer 200 is formed from the materials for the black matrix, not only the cost is low, but also the production process is simple, for example, it can be formed by an inkjet printing process, or an etching process. The present disclosure is not intended to make any further limitation on this and they can be selected as actually required.

In this way, on one hand, the first lens device 101, the second lens device 102 and the light-shielding portion 20 can be directly made on the transparent substrate 30, and the grating 01 is installed into the dual vision display apparatus as a whole after it is finished thereby simplifying the production process and installation process; on the other hand, the grating 01 can be applicable to the dual vision display apparatus having different sizes under the support of the transparent substrate 30 by adjusting the thickness of the transparent substrate 30, for example, the thickness of the transparent substrate 30 can be increased for the large scale dual vision display apparatus, so as to prevent the central portion of the grating 01 from being deformed due to the gravity thereof.

On this basis, in order to further simplify the process and to reduce the production cost, the first lens device 101, the second lens device 102 can be integral with the transparent substrate 30 in the embodiments of the present disclosure, for example, they can be made by a primary molding, for example with an injecting molding process. The specific setting of the integral structure can be further explained below.

For example, as shown in FIG. 6, the first lens device 101 and the second lens device 102 are protrusions provided on the transparent substrate 30.

Figure 7:
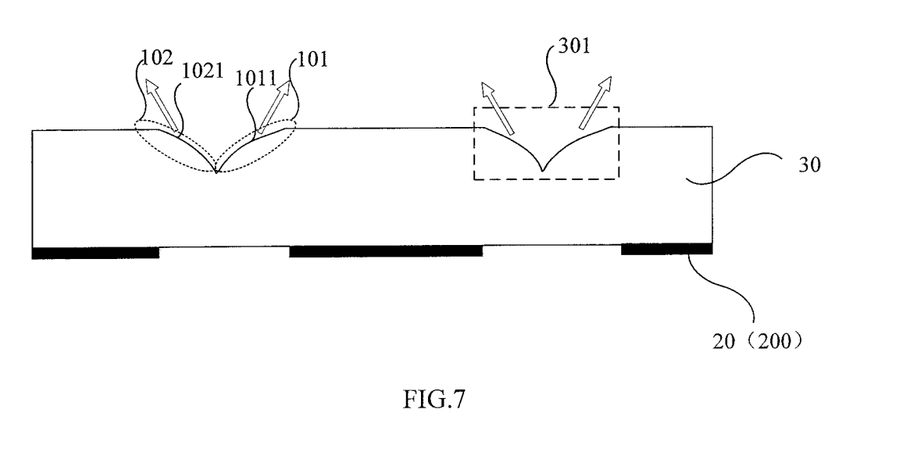
FIG. 7 is a schematic view showing a structure for another grating provided by another embodiment of the present disclosure.

Again, for example, as shown in FIG. 7, a groove 301 is provided on the transparent substrate 30, and an inner wall of the groove 301 constitutes arc-shaped surfaces (1011, 1021) of the first lens device 101 and the second lens device 102.

As compared to the protrusions in FIG. 6, the groove shown in FIG. 7 requires the transparent substrate 30 to have a relatively large thickness, thereby increasing the weight of the entire grating 01. Therefore, the design of the first lens device 101 and the second lens device 102 as shown in FIG. 6 can well meet the requirements on the thin and light-weight concept of the display apparatus. Therefore, the present disclosure is further explained by taking the case that the first lens device 101 and the second lens device 102 are the protrusions on the transparent substrate 30, as an example.

In addition, the light-shielding layer 200 in the present disclosure, as shown in FIG. 6, can be provided at the light exiting side of the transparent substrate 30; or as shown in FIG. 7 can be provided at a light incident side of the transparent substrate 30. These can be chosen as actually required.

Figure 8:
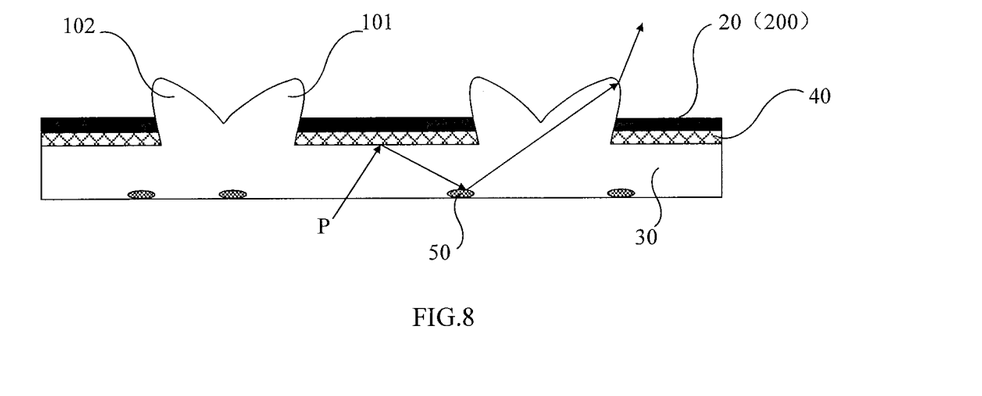
FIG. 8 is a schematic view showing a structure for a yet another grating provided by a further embodiment of the present disclosure.

On this basis, for the purpose of further increasing the effective utilization rate of the dual vision display apparatus including the grating 01 to the lights, for example, as shown in FIG. 8, the grating 01 further includes a reflective layer 40, located on the light-shielding portion 20 and between the transparent substrate 30 and the light-shielding layer 200, and the light-shielding layer 200 is located at the light exiting side of the transparent substrate 30. With such configuration that the grating 01 is applicable to the liquid crystal types of the dual vision display apparatus of having the backlight module BLU, the lights reflected by the reflective layer 40 can again enter the backlight module BLU. Through the reflection of the reflective mesh dots in the backlight module BLU, the lights then enter the grating 01. Therefore, the lights can be more effectively utilized (specifically with reference to FIG. 10b), that is, the effective utilization rate of the light source for the dual vision display apparatus is further improved.

Further, as shown in FIG. 8, the grating 01 further includes mesh dots 50 which are located at the light incident side of the transparent substrate 30, and are used for dispersing the lights reflected by the reflective layer 50 to the first lens device 101 and the second lens device 102. For example, as shown in FIG. 8, after the reflection of the reflective layer 40 and the dispersion of the mesh dots 50, the light P can enter the second lens device 102 and be effectively used, thereby further improving the effective utilization rate to the light.

It should be realized that during the practical production, the above mesh dots 50 can be located at a light incident side of the transparent substrate 30 and be made by a separate production process; alternatively, it can be an integral structure with the transparent substrate 30, for example by a primary molding such as an injecting molding process. Of course, in order to simplify the production process, it is intended in the present disclosure to set the mesh dots 50 and the transparent substrate 30 in a form of one piece. In the embodiments of the present disclosure, the mesh dots represent the dot-like arrangements distributed on the transparent substrate for dispersing or reflecting the light, and each mesh dot can have a shape like a protrusion or a recess.

Figure 9A:
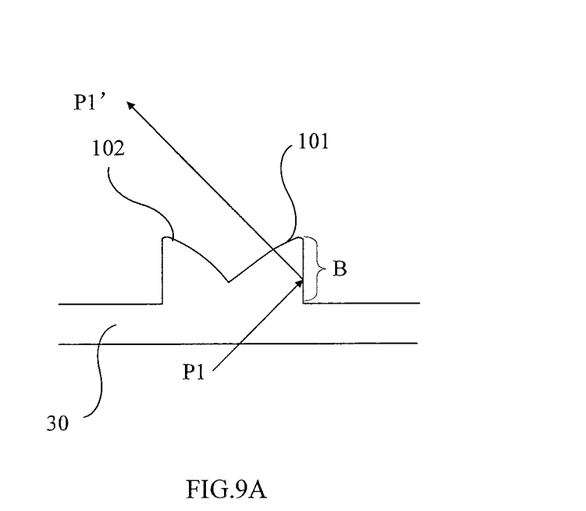
FIG. 9A is a schematic view of an optical path for one grating provided by an embodiment of the present disclosure.

Furthermore, it is desired to consider to prevent part of lights incident onto a side face B of the first lens device 101 and/or the second lens device 102 from being reflected by the side face B into an opposite field of view to disturb normal pictures observed by a viewer in the opposite field of view. For example, the light P1 shown in FIG. 9A is incident onto the side face B of the first lens device 101 and reflected by the side face B into the left field of view corresponding to the second lens device 102 (as indicated by the light P1'), thus the normal pictures observed by the viewer in the left field of view will be disturbed.

Figure 9B:
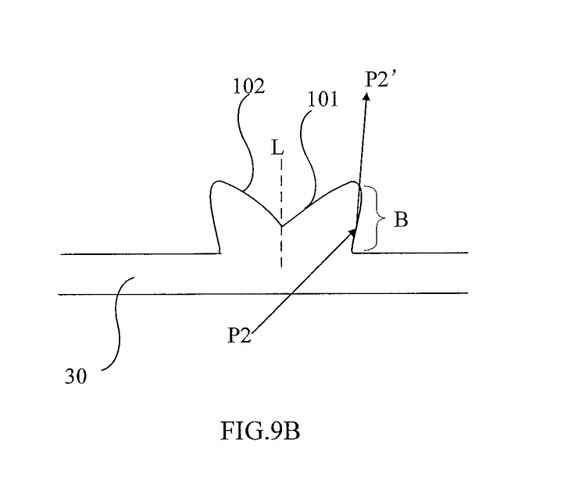
FIG. 9B is a schematic view of an optical path for another grating provided by another embodiment of the present disclosure.

In view of the above, in some embodiment of the present disclosure, a distance between the longitudinal central plane L and a top edge (for example a highest point on the convex face) of a side face B of the first lens device 101 facing towards the light-shielding portion 20 adjacent to the first lens device 101 is larger than that between the longitudinal central plane L and a bottom edge of the side face B of the first lens device 101, that is, the side face B of the first lens device 101 is inclined towards the side away from the longitudinal central plane L, as shown in FIG. 9B, so that the light P2 incident on the side face B will not enter the opposite field of view (the field of view corresponding to the second lens device 102, the left field of view) after the reflection of the side face B, but enter the $\theta_{blind}$ region or the field of view (the right field of view) corresponding to the first lens device 101 (as indicated by the light P2'). Of course, in order to sufficiently improve the effective utilization rate of the light, in some embodiments of the present disclosure, the inclination of the side face B is adjusted to ensure that the light incident on the side face B enters the ranges of the field of view corresponding to the first lens device 101 after reflection of the side face B, thereby effectively utilizing the light.

The setting of the side face for the second lens device 102 can be the same as that of the side face for the first lens device 101, that is, a distance between the longitudinal central plane L and a top edge (for example a highest point on the convex face) of a side face of the second lens device 102 facing towards the light-shielding portion 20 adjacent to the second lens device 102 is larger than that between the longitudinal central plane L and a bottom edge of the side face of the second lens device 102, that is, the side face of the second lens device 102 is inclined towards the side away from the longitudinal central plane L, so that the light incident on the side face B will not enter the opposite view field (the field of view corresponding to the second lens device 102, the right field of view) after the reflection of the side face B, but enter the $\theta_{blind}$ region or the field of view (the left field of view) corresponding to the second lens device 102. Of course, in order to sufficiently improve the effective utilization rate of the light, in some embodiments of the present disclosure, the inclination of the side face B is adjusted to ensure that the light incident onto the side face B enters the ranges of the field of view corresponding to the second lens device 102 after reflection of the side face B, thereby effectively utilizing the light.

Figure 10A:
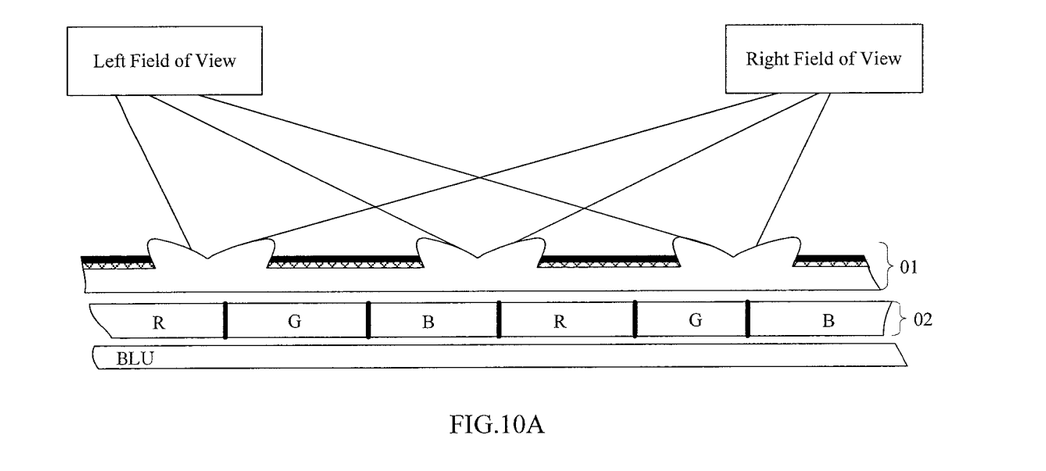
FIG. 10A is a schematic view showing a structure of a dual vision display apparatus including a grating provided by an embodiment of the present disclosure.
Figure 10B:
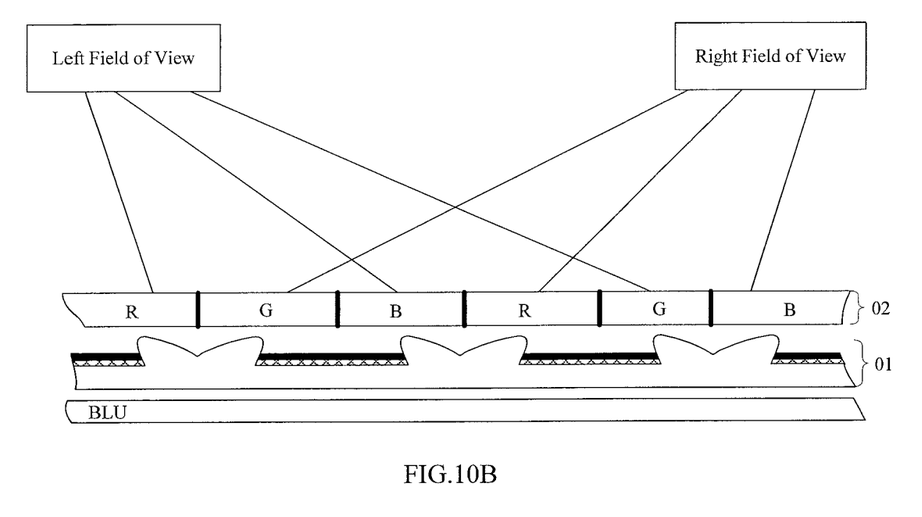
FIG. 10B is a schematic view of showing a structure of another dual vision display apparatus including a grating provided by another embodiment of the present disclosure.

In addition, as for the dual vision display apparatus, as shown in FIG. 10A and FIG. 10B, in a case that it includes the liquid crystal display panel 02, for example, the liquid crystal display panel 02 can be divided into red R, green G and blue B sub-pixels in a matrix arrangement, and the dual vision display apparatus further includes the backlight module BLU. In view of this, the grating 01 can be located at the light exiting side of the liquid crystal display panel 02, as shown in FIG. 10A; or the grating 01 can be located between the backlight module BLU and the liquid crystal display panel 02 as shown in FIG. 10B. Both of them can meet the requirements to the light in the left field of view and the right field of view in the dual vision display apparatus.

In the case that the grating 01 is arranged at the light emitting side of the liquid crystal display panel 02 as shown in FIG. 10A, the light reflected by the reflective layer 40 will enter the liquid crystal display panel 02 again to disturb the picture of display.

As shown in FIG. 10B, the arrangement that the grating 01 is provided between the backlight module BLU and the liquid crystal display panel 02, on one hand, prevents the light reflected by the reflective layer 40 from entering the liquid crystal display panel 02 to disturb the display picture; on the other hand, it allows a part of the light reflected by the reflective layer 40 to enter the backlight module BLU, to be reflected by the mesh dots in the backlight module BLU and again enter the grating 01, thereby effectively utilizing the lights. That is, the effective utilization rate of the light source for the dual vision display apparatus is further increased. Therefore, as an example, the grating 01 is located between the backlight module BLU and the liquid crystal display panel 02.

The above description is only the specific embodiment of the present disclosure, but the scope of the present disclosure is not limited to this. Under the present disclosure, changes or modifications which can be readily envisaged by those skilled in the art shall fall within the scope of the present disclosure. Thus, the scope of present disclosure is defined by the claims and their equivalents.

What is claimed is:

1. A grating for dual vision display, comprising:
   a plurality of light-transmitting portions and a plurality of light-shielding portions arranged alternatively;
   wherein each of the light-transmitting portions comprises a first lens device and a second lens device, the first lens device is configured to converge a light incident onto the first lens device towards a first direction so as to give an image display at a first view angle; and the second lens device is configured to converge a light incident onto the second lens device towards a second direction so as to give an image display at a second view angle.

2. The grating as claimed in claim 1, wherein the first direction is a direction inclined towards a side where the first lens device is located, of the light-transmitting portion from a longitudinal central plane of the light-transmitting portion, the second direction is a direction inclined towards a side where the second lens device is located, of the light-transmitting portion from the longitudinal central plane of the light-transmitting portion, and the first lens device and the second lens device are respectively located at two sides of the longitudinal central plane of the light-transmitting portion.

3. The grating as claimed in claim 1, wherein both the light-transmitting portions and the light-shielding portions are strip-shaped.

4. The grating as claimed in claim 1, wherein the first lens device and the second lens device within a same light-transmitting portion are adjoined with each other.

5. The grating as claimed in claim 1, wherein each the first lens device and the second lens device is constituted by one or more converging lens.

6. The grating as claimed in claim 5, wherein the converging lens is a convex lens.

7. The grating as claimed in claim 2, wherein each of the first lens device and the second lens device has a side facing towards the longitudinal central plane of the light-transmitting portion in which the each of the first lens device and the second lens device is located and an opposite side adjoined with one of the light-shielding portions.

8. The grating as claimed in claim 2, wherein each of the first lens device and the second lens device has a side facing towards the longitudinal central plane of the light-transmitting portion in which the each of the first lens device and the second lens device is located and an opposite side partially overlapped with one of the light-shielding portions.

9. The grating as claimed in claim 1, wherein the grating further comprises a transparent substrate for carrying the first lens device, the second lens device and the light-shielding portions.

10. The grating as claimed in claim 9, wherein the first lens device and the second lens device are integral with the transparent substrate.

11. The grating as claimed in claim 10, wherein a recess is provided on the transparent substrate, and an inner wall of the recess constitutes arc-shaped surfaces of the first lens device and the second lens device.

12. The grating as claimed in claim 10, wherein each of the first lens device and the second lens device is formed by protrusions provided on the transparent substrate.

13. The grating as claimed in claim 12, wherein distance between the longitudinal central plane of the light-transmitting portion in which the first lens device is located and a top edge of a side face of the first lens device facing towards the light-shielding portion adjacent to the first lens device is larger than distance between the longitudinal central plane and a bottom edge of the side face of the first lens device.

14. The grating as claimed in claim 12, wherein distance between the longitudinal central plane of the light-transmitting portion in which the second lens device is located and a top edge of a side face of the second lens device facing towards the light-shielding portion adjacent to the second lens device is larger than distance between the longitudinal central plane and a bottom edge of the side face of the second lens device.

15. The grating as claimed in claim 1, wherein each of the light-shielding portions comprises a light-shielding layer composed of opaque material.

16. The grating as claimed in claim 15, wherein the grating further comprises a transparent substrate for carrying the first lens device, the second lens device and the light-shielding portions, and the light-shielding layer is located at a light exiting side of the transparent substrate;

the grating further comprises a reflective layer located on the light-shielding portion and provided between the transparent substrate and the light-shielding layer.

17. The grating as claimed in claim 16, wherein the grating further comprises mesh dots located at a light incident side of the transparent substrate, for scattering the lights reflected by the reflective layer to each of the first lens device and the second lens device via the mesh dots.

18. The grating as claimed in claim 17, wherein the mesh dots are integral with the transparent substrate.

19. A dual vision display apparatus, comprising the grating as claimed in claim 1.

20. The dual vision display apparatus as claimed in claim 19, wherein the dual vision display apparatus is a liquid crystal display apparatus comprising a backlight module and a liquid crystal display panel, and the grating is located between the backlight module and the liquid crystal display panel, or located on a side of the liquid crystal display apparatus facing away from the backlight module.

* * * * *

UNITED STATES PATENT AND TRADEMARK OFFICE
CERTIFICATE OF CORRECTION

Page 1 of 1

PATENT NO. : 10,782,457 B2
APPLICATION NO. : 16/318628
DATED : September 22, 2020
INVENTOR(S) : Xiuyun Chen et al.

It is certified that error appears in the above-identified patent and that said Letters Patent is hereby corrected as shown below:

On the Title Page

In Item (86) (Sub-section 2), in Column 1, Line 3, change the PCT Publication date from "January 17, 2019" to --February 7, 2018--.

Signed and Sealed this
Twenty-seventh Day of October, 2020

Andrei Iancu
*Director of the United States Patent and Trademark Office*